(12) United States Patent
Anderson et al.

(10) Patent No.: US 12,398,614 B2
(45) Date of Patent: Aug. 26, 2025

(54) HIGH PERFORMANCE FLUOROELASTOMER BONDED SEAL FOR DOWNHOLE APPLICATIONS

(71) Applicant: Schlumberger Technology Corporation, Sugar Land, TX (US)

(72) Inventors: Mark Anderson, Pearland, TX (US); Jushik Yun, Sugar Land, TX (US); John Zarnowiecki, Houston, TX (US); Aurelien Mainy, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1085 days.

(21) Appl. No.: 16/982,078

(22) PCT Filed: Mar. 20, 2019

(86) PCT No.: PCT/US2019/023072
§ 371 (c)(1),
(2) Date: Sep. 18, 2020

(87) PCT Pub. No.: WO2019/183160
PCT Pub. Date: Sep. 26, 2019

(65) Prior Publication Data
US 2021/0095541 A1      Apr. 1, 2021

Related U.S. Application Data

(60) Provisional application No. 62/646,355, filed on Mar. 21, 2018.

(51) Int. Cl.
*E21B 33/10*     (2006.01)
*F16J 15/3284*   (2016.01)

(52) U.S. Cl.
CPC .......... *E21B 33/10* (2013.01); *F16J 15/3284* (2013.01)

(58) Field of Classification Search
CPC .............................. E21B 33/10; F16J 15/3284
USPC ........................................................ 428/167
See application file for complete search history.

(56) References Cited

U.S. PATENT DOCUMENTS

| | | | |
|---|---|---|---|
| 4,079,168 | A  | 3/1978  | Schwemmer et al. |
| 4,694,045 | A  | 9/1987  | Moore |
| 5,274,049 | A  | 12/1993 | Zielinski et al. |
| 5,456,327 | A  | 10/1995 | Denton et al. |
| 6,409,874 | B1 | 6/2002  | Van Der Aar et al. |
| 7,304,098 | B2 | 12/2007 | Li et al. |
| 7,467,799 | B1 | 12/2008 | Tarlton |

(Continued)

FOREIGN PATENT DOCUMENTS

| | | | | |
|---|---|---|---|---|
| CN | 102667268 A     | 9/2012 | | |
| TW | 201533127 A     | 9/2015 | | |
| WO | WO-2014004571 A2 | * | 1/2014 | ............. E21B 23/01 |

OTHER PUBLICATIONS

International Search Report and Written Opinion issued in the PCT application PCT/US2019/023072, dated Jul. 3, 2019 (11 pages).

(Continued)

*Primary Examiner* — Tahseen Khan
(74) *Attorney, Agent, or Firm* — Jeffrey D. Frantz

(57) ABSTRACT

A bonded seal includes a metal alloy substrate, a bonding agent, and a perfluoroelastomer bonded to at least a portion of the metal alloy substrate via the bonding agent.

17 Claims, 5 Drawing Sheets

(56) References Cited

U.S. PATENT DOCUMENTS

| | | | |
|---|---|---|---|
| 8,607,861 B2* | 12/2013 | Saylor, III | F16J 15/0881 |
| | | | 166/134 |
| 2005/0171248 A1 | 8/2005 | Li et al. | |
| 2006/0006606 A1* | 1/2006 | Smith | F16J 15/32 |
| | | | 277/500 |
| 2009/0018275 A1 | 1/2009 | Campbell et al. | |
| 2010/0232999 A1 | 9/2010 | Okoroafor | |
| 2011/0156356 A1* | 6/2011 | Noguchi | F01C 19/005 |
| | | | 524/495 |
| 2011/0236692 A1 | 9/2011 | Luo et al. | |
| 2012/0100379 A1 | 4/2012 | Luo et al. | |
| 2013/0043657 A1* | 2/2013 | Carringer | E21B 33/04 |
| | | | 277/322 |
| 2013/0300066 A1 | 11/2013 | Xu et al. | |
| 2014/0124199 A1* | 5/2014 | Gorrara | E21B 23/02 |
| | | | 166/298 |
| 2014/0367082 A1* | 12/2014 | Gamble | E21B 33/038 |
| | | | 166/88.1 |
| 2016/0032681 A1 | 2/2016 | McGruddy et al. | |
| 2017/0015824 A1* | 1/2017 | Gozalo | C08L 33/18 |
| 2017/0284167 A1* | 10/2017 | Takahashi | E21B 43/27 |

OTHER PUBLICATIONS

International Preliminary Report on Patentability issued in the PCT application PCT/US2019/023072, dated Oct. 1, 2020 (8 pages).

* cited by examiner

HIGH PERFORMANCE FLUOROELASTOMER BONDED SEAL FOR DOWNHOLE APPLICATIONS

CROSS-REFERENCE TO RELATED APPLICATION

This application is a national stage entry under 35 U.S.C. 371 of International Application No. PCT/US2019/023072, filed Mar. 20, 2019, which is based on and claims priority to U.S. Provisional Patent Application Ser. No. 62/646,355, filed Mar. 21, 2018, which is incorporated herein by reference.

BACKGROUND

Various types of elastomers are used for sealing in downhole applications. Selection of the appropriate elastomeric material depends on the mechanical application and the downhole environment.

SUMMARY

A bonded seal is disclosed. More specifically, a perfluoroelastomer bonded seal is disclosed. Various other apparatuses, systems, methods, composite structures, etc. are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 2b shows an end of the bonded seal of FIG. 2a.

FIG. 3b shows an end of the bonded seal including FFKM of FIG. 3a.

FIG. 4b shows an end of the bonded seal including FFKM of FIG. 4a.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As an example, a material or materials may be processed to form processed material. In such an example, the processed material may be compressed, machined, formed, etc. to produce a part or parts. As an example, a part may be a component or a portion of a component. A part may be included in equipment, which may be suitable for use in an environment such as, for example, a downhole environment. As an example, equipment may be drilling equipment, cementing equipment, fracturing equipment, sampling equipment, or other type of equipment. As an example, equipment may be borehole equipment. As an example, a tool may be a borehole tool, for example, suitable to perform a function or functions in a downhole environment in a borehole.

As an example, equipment may include one or more elastomeric components. An elastomer can be defined as being a polymeric material characterized by at least some amount of viscoelasticity (e.g., viscosity and elasticity). As an example, an elastomer can have a relatively low Young's modulus and, for example, a relatively high failure strain compared to various other materials. An example of an elastomer is rubber, which can include vulcanizates.

Elastomers may be characterized as being amorphous polymeric materials that exist above their glass transition temperature, for example, such that considerable segmental motion is possible. At ambient temperatures, rubbers are thus relatively soft (e.g., consider a Young's modulus "E" of about 3 MPa) and deformable.

Elastomers may be used, for example, as seals, adhesives, molded flexible parts, etc. As an example, an elastomer may be a damping element, an insulating element, a seal element, etc.

As an example, a seal element may include an elastomer, optionally in addition to one or more other materials. As an example, a component can include a material that is relatively rigid and a material that is elastomeric. For example, consider a component where an elastomer covers at least a portion of a metal or metal alloy structure. In such an example, the elastomer may impart surface properties that can assist with an operation, a function, etc., of a component.

Figure 1:
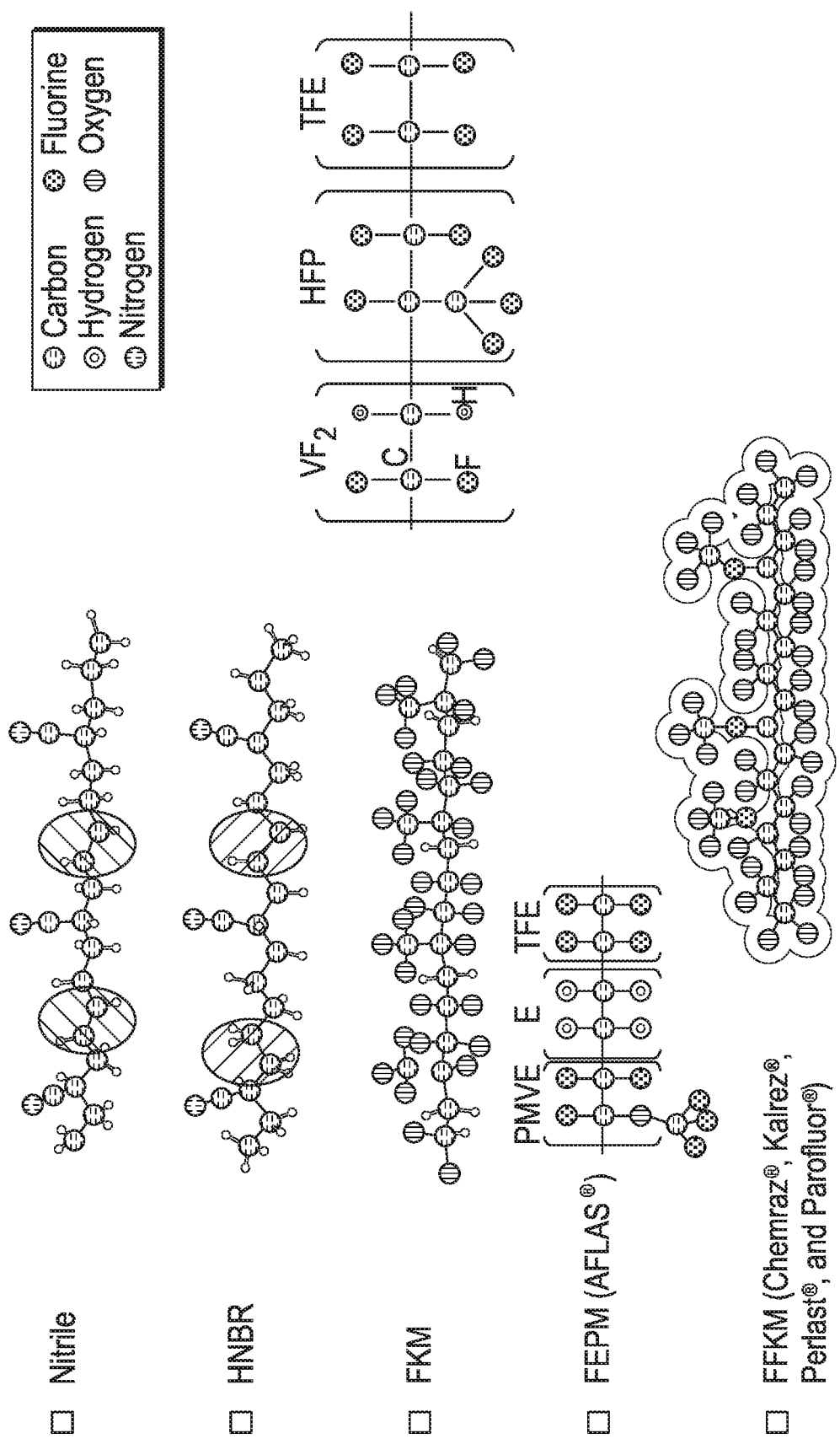
FIG. 1 shows different elastomer types.

In an elastomer, monomers can be linked to form a backbone, chains, a network, etc. As an example, an elastomer can include one or more of carbon, hydrogen, oxygen and silicon. Referring now to FIG. 1, different elastomer types are shown. For example, consider nitrile rubber, also known as Buna-N, Perbunan, acrylonitrile butadiene rubber, and NBR, which is a synthetic rubber copolymer of acrylonitrile (ACN) and butadiene. Thus, NBR includes a carbon-based backbone (e.g., chains). Nitrile butadiene rubber (NBR) is a family of unsaturated copolymers of 2-propenenitrile and, for example, various butadiene monomers (1,2-butadiene and 1,3-butadiene). NBR tends to be resistant to oil, fuel, and various other chemicals where, as nitrile within the polymer increases, resistance to oils tends to be higher, however, with lower material flexibility.

NBR tends to have excellent mechanical properties and flexible formulations. As such, NBR may be used for general purpose sealing in the environment for petroleum oil and fluids, grease and oils and water/glycol fluids. However, because NBR is limited for sour service and heavy brines, NBR is generally not used in environments containing hydrogen sulfide ($H_2S$), strong bases (e.g., high pH completion brine, >10), zinc bromide, strong acids, or nitro hydrocarbons (e.g., amines, nitrobenzene, aniline). Further, NBR is generally not resistant to ozone, sunlight, or weather.

Still referring to FIG. 1, another type of elastomer is hydrogenated nitrile butadiene rubber, or HNBR, which can be formed by reacting NBR with hydrogen. That is, HNBR is a sub group of the NBR (nitrile) family. As an example, a process can include producing an emulsion-polymerized NBR, dissolving the NBR in an appropriate solvent and then adding hydrogen gas in conjunction with a precious metal catalyst at a designated temperature and pressure to cause selective hydrogenation that produces HNBR as a "highly saturated nitrile" (HSN) polymer.

HNBR may continue to operate at temperatures in a range of 275° F. to 325° F. Further, HNBR may operate at a temperature as high as 350° F. for a short period of time. While HNBR performs better than NBR in $H_2S$ environments, its performance is limited. HNBR performs better than NBR in amine environments. If properly formulated, HNBR has excellent mechanical properties.

Still referring to FIG. 1, another type of elastomer is FKM, which as understood by those skilled in the art, is the ASTM designation for fluoroelastomers, which is a class of fluorinated, carbon-based synthetic rubber. FKM may continue to operate at temperatures in a range of 300° F. to a maximum temperature of 450° F. As such, FKM has a higher temperature rating than NBR and HNBR. Due to its oil resistant properties, FKM is recommended for use in crude oil, petroleum oils, di-ester base lubricants, silicate ester base lubricants, silicone fluids and greases, halogenated hydrocarbons (e.g., Freon, trichloroethylene), selected phosphate ester fluids, and acids. FKM exhibits excellent resistance to air and oxygen and high temperature resistance. FKM is also resistant to $H_2S$. However, FKM is not compatible with amine-based inhibitors, steam, or high pH (>9) solutions. Accordingly, for example, FKM may be implemented for sour service without amine-based inhibitors if a high pH environment is avoided. Moreover, FKM is not suitable for environments containing ketones (e.g., MEK, acetone), skydrol fluids, amines, UDHM, anhydrous ammonia, low molecular weight esters and ethers, or hot hydrofluoric or chlorosulfonic acids. An example brand of FKM is Viton.

Still referring to FIG. 1, another type of elastomer is Aflas (Asahi Glass Co.), which is a trade name for a copolymer of tetrafluoroethylene and propylene, or FEPM. Depending on both the compound and the grade, the FEPM may operate at a temperature range of 40° F. to +450° F. However, O-rings or compression seals that include FEPM may not function below 75° F. at pressures over 5000 psi. Because FEPM is resistant to $H_2S$, it may be implemented for sour service. Further, FEPM exhibits excellent resistance to deterioration by exposure to air and oxygen. FEPM is also resistant to high temperatures, amine-based products, steam, and high pH (>9) solutions and fluids. However, FEPM performs poorly at low temperatures, has poor extrusion resistance such that an anti-extrusion device must be concurrently used, and exhibits poor mechanical properties at high temperatures. Further, FEPM exhibits high swelling in aromatic solvents.

Still referring to FIG. 1, Chemraz® and Kalrez® are brands of perfluoroelastomers, or FFKM, which includes copolymers similar to perfluoromethylvinylether and tetrafluoroethylene. Depending on both the compound and the grade, the FFKM may operate at a temperature range of −40° F. to +600° F. However, O-rings or compression seals that include FFKM may not function below 75° F. at pressures over 5000 psi. FFKM is the most inert fluoropolymer with well condition chemicals in the elevated temperature. However, FFKM exhibits poor low temperature performance, poor extrusion resistance, and poor mechanical properties. Also, FFKM is unworkable for molding thick parts, and it is very expensive. FFKM is unsuitable for environments that include liquid oxygen, extreme oxidizers, hot fluorine gas, and hot hydrofluoric acids.

As an example, a sealing system may include elastomeric and metallic components. For example, a sealing system may provide a leak-proof seal between equipment such as a packer and production tubing in a completion downhole. Sealing systems may be used in production wells, injection wells, and sand-control completions applications. The sealing system may include a bonded seal having an elastomeric material selected based on the equipment application and the temperature and chemistry of the environment downhole. Bonded seals are tolerant to damage from debris, tubing movement, and unloading of the seals under pressure.

Figure 2B:
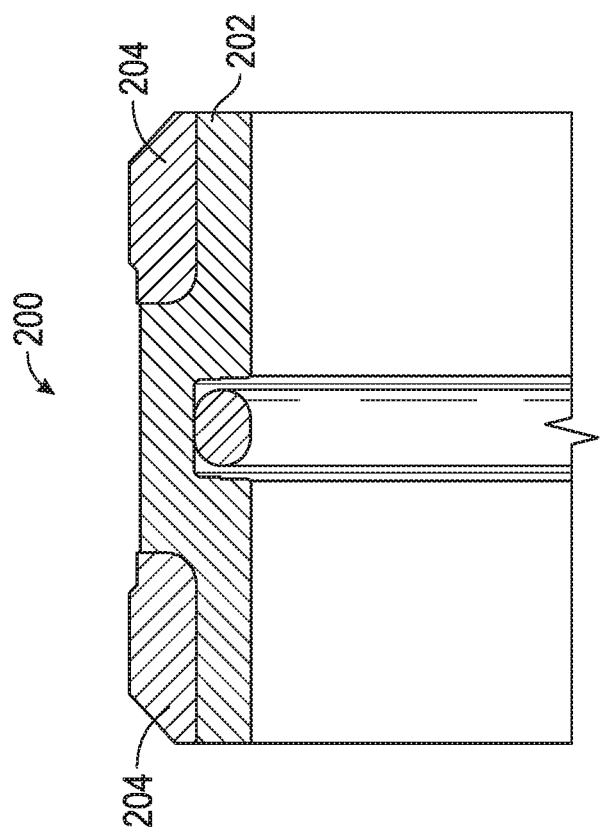
Figure 2A:
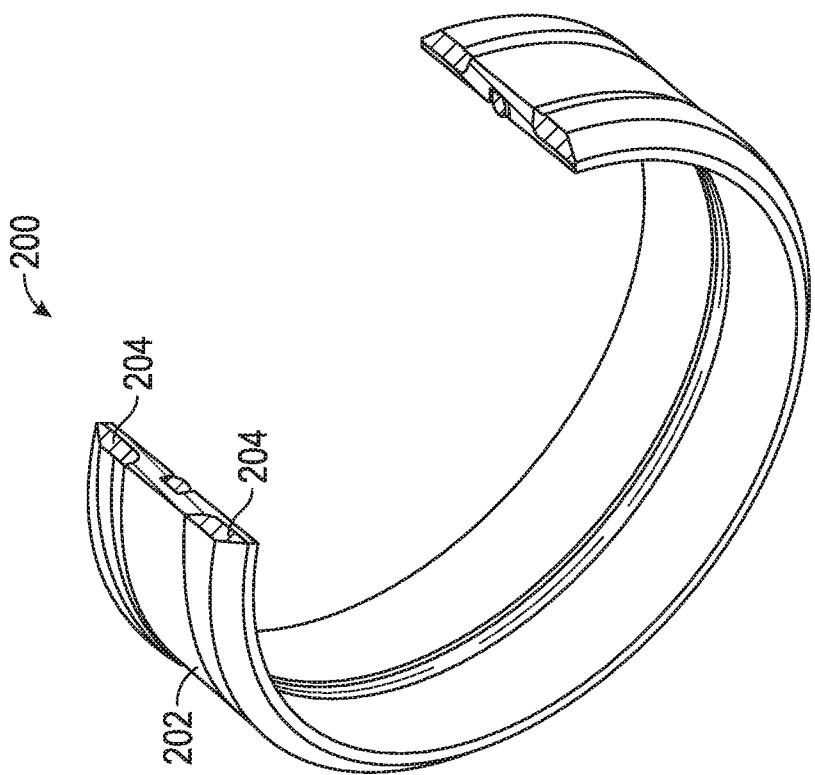
FIG. 2a shows a cutaway perspective view of a bonded seal.

Referring now to FIG. 2a, a cutaway perspective view of a bonded seal is shown. FIG. 2b shows an end of the bonded seal of FIG. 2a. For example, FIGS. 2a and 2b show a standard bonded seal 200, which includes a metal substrate 202 and an elastomer 204 bonded to each side of the metal substrate 202. In addition to or instead of being bonded to each side of the metal substrate 202, the elastomer 204 may be bonded onto an inner diameter of the metal substrate 202, according to one or more embodiments of the disclosure. For example, the elastomer 204 may be any of the elastomer described in this disclosure, including Nitrile, HNBR, or FKM.

Figure 3B:
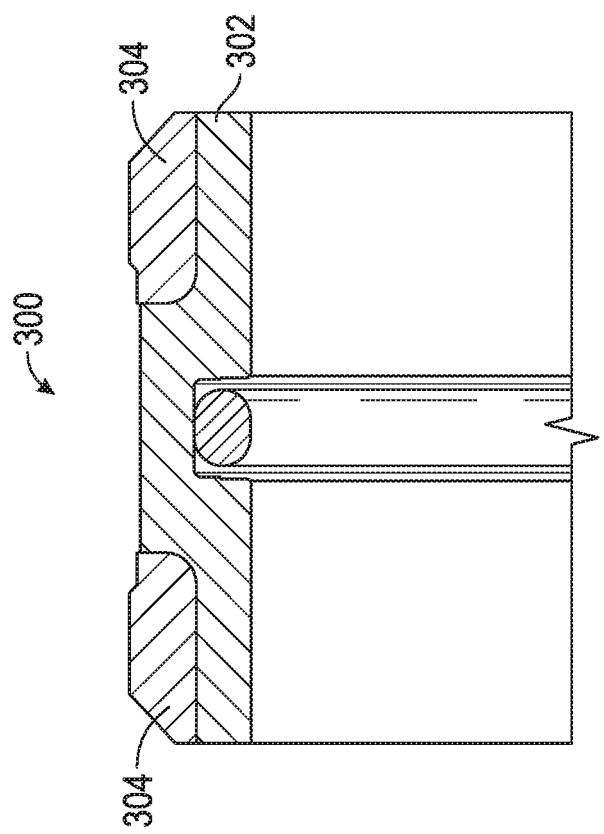
Figure 3A:
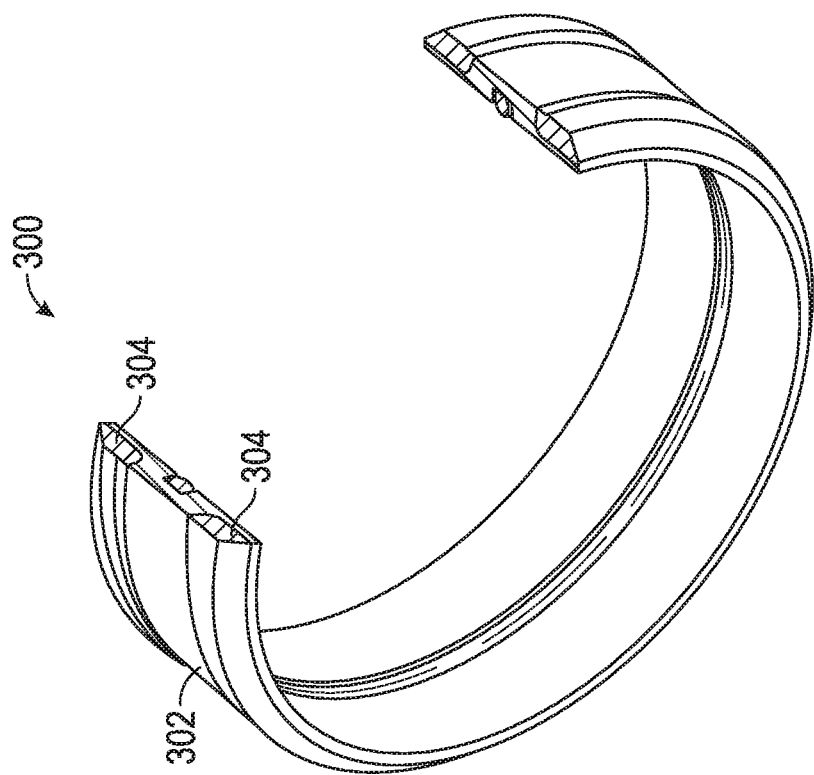
FIG. 3a shows a cutaway perspective view of a bonded seal including FFKM according to an embodiment.

FIG. 3a shows a cutaway perspective view of a bonded seal including FFKM according to an embodiment. FIG. 3b shows an end of the bonded seal including FFKM of FIG. 3a. For example, FIGS. 3a and 3b show a standard FFKM bonded seal 300, which includes a metal substrate 302 and an FFKM elastomer 304 bonded to each side of the metal substrate 302. In addition to or instead of being bonded to each side of the metal substrate 302, the FFKM elastomer 304 may be bonded onto an inner diameter of the metal substrate 302, according to one or more embodiments of the disclosure. For example, the metal substrate 302 may be a metal ring. According to one or more embodiments, the metal substrate 302 may be a metal alloy having at least one of 13% chromium steel (13Cr), 316 stainless steel, nickel-based steel alloy (e.g., Iconel® 825, Hastelloy alloy, Iconel® 925, etc.), 9Cr/1 Mo steel, carbon alloy steel, L-80/N-80, 1 Cr equivalent, 25Cr, 718, or any other steel substrate.

Still referring to FIGS. 3a and 3b, the FFKM elastomer 304 may be Kalrez®, Chemraz®, Perlast®, Parofluor®, or any other elastomer or perfluoroelastomer that has a higher amount of fluoride content than FKM and FEPM, as previously described. For example, the FFKM elastomer 304 may measure up to approximately 2.67 inches to approximately 7.125 inches. Further, in one or more embodiments, the FFKM elastomer 304 may be rated up to 15,000 psi at 350° F.

Still referring to FIGS. 3a and 3b, the FFKM elastomer 304 may be bonded to the metal substrate 302 using a bonding agent. For example, the bonding agent may include at least one of an adhesive and a primer. In one or more embodiments, the bonding agent may be Chemlok® adhesive in conjunction with Chemlok® primer. In one or more embodiments, the bonding agent may be disposed on surface of the metal substrate 302. In other embodiments, the FFKM elastomer 304 may be impregnated with the bonding agent.

Still referring to FIGS. 3a and 3b, the FFKM elastomer 304 may include a curing agent. In one or more embodiments, the curing agent may include a peroxide (2,5 dimethyl 2,5 di(t-butyl peroxy) hexane (DBPH). In other embodiments, the FFKM elastomer 304 may also include a co-agent such as Triallyl Isocyanate (TAIC). However, the curing agent included in the FFKM elastomer is not limited, and the FFKM elastomer may also include another cure system such as bisphenol cure system and/or diamine-type cure agents.

Figure 4B:
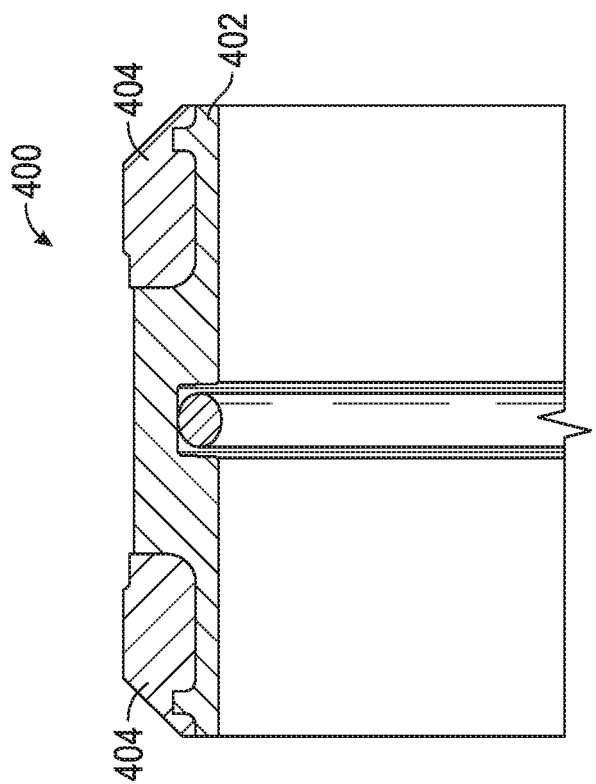
Figure 4A:
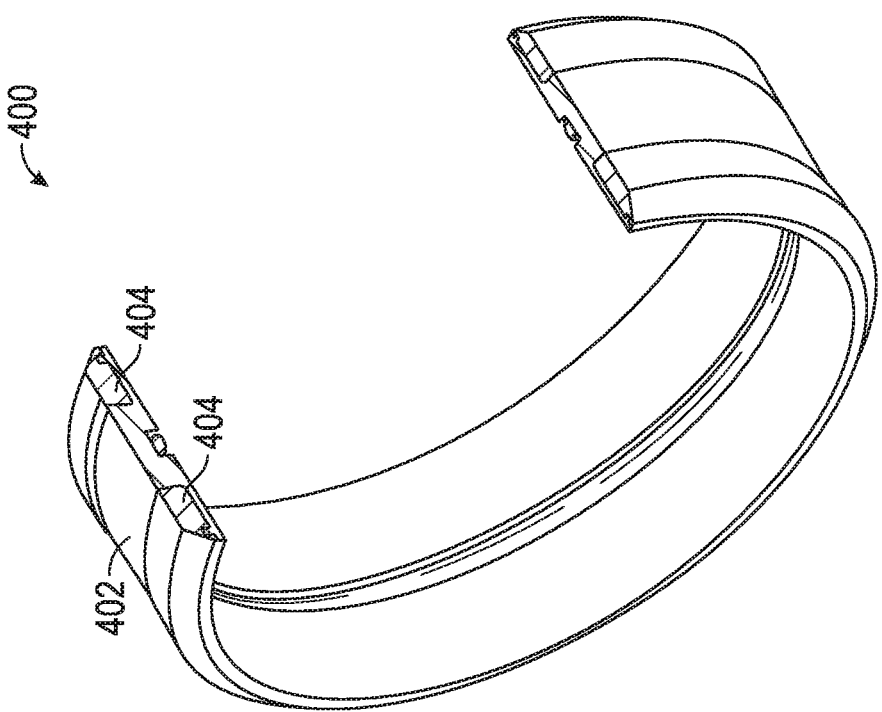
FIG. 4a shows a cutaway perspective view of a bonded seal including FFKM according to an embodiment.

FIG. 4a shows a cutaway perspective view of a bonded seal including FFKM according to an embodiment. FIG. 4b shows an end of the bonded seal including FFKM of FIG. 4a. For example, FIGS. 4a and 4b show a ribbed FFKM bonded seal 400, which includes a metal substrate 402 and a ribbed FFKM elastomer 404 bonded to each side of the metal substrate 402. In addition to or instead of being bonded to each side of the metal substrate 402, the FFKM elastomer 404 may be bonded onto an inner diameter of the metal substrate 402, according to one or more embodiments of the disclosure. For example, the ribbed FFKM bonded seal 400 may have a 4 inch size and may be rated up to 12.500 psi at 250° F. Advantageously, the ribbed FFKM bonded seal 400 may provide additional metal back up to control the flow of the ribbed FFKM elastomer 404, and additional surface area for bonding the ribbed FFKM elastomer 404 to the metal substrate 402.

Still referring to FIGS. 4a and 4b, for example, the metal substrate 402 may be a metal ring. According to one or more embodiments, the metal substrate 402 may be a metal alloy having at least one of 13% chromium steel (13Cr), 316 stainless steel, nickel-based steel alloy (e.g., Iconel® 825, Hastelloy alloy, Iconel® 925, etc.), 9Cr/1 Mo steel, carbon alloy steel, L-80/N-80, 1 Cr equivalent, 25Cr, 718, or any other steel substrate.

Still referring to FIGS. 4a and 4b, the ribbed FFKM elastomer 404 may be Kalrez®, Chemraz®, Perlast®, Parofluor®, or any other elastomer or perfluoroelastomer that has a higher amount of fluoride content than FKM and FEPM, as previously described. Further, the ribbed FFKM elastomer 404 may be bonded to the metal substrate 402 with a bonding agent, as described in previous embodiments. Moreover, the ribbed FFKM elastomer 404 may include a curing agent as described in previous embodiments.

Figure 5:
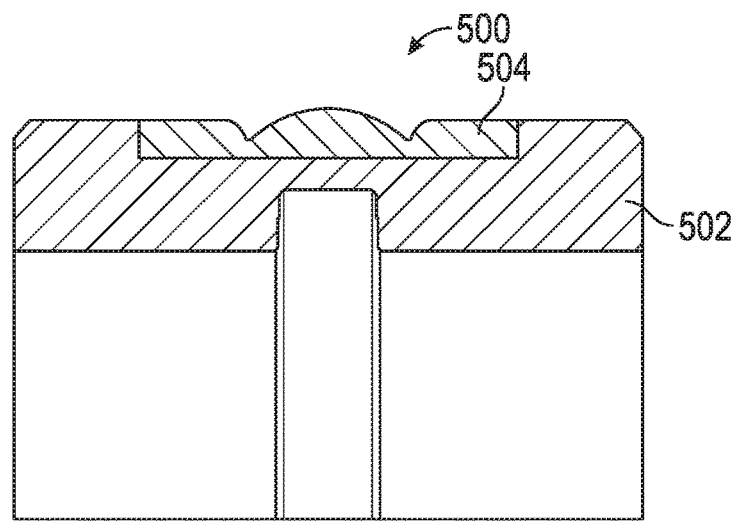
FIG. 5 shows an end of a bonded seal including FFKM according to an embodiment.

FIG. 5 shows an end of a bonded seal including FFKM according to an embodiment. For example, FIG. 5 shows an FFKM bonded seal 500, which includes a metal substrate 502 and an FFKM elastomer 504 trapped between two hard ends of the metal substrate 502. In addition to or instead of being trapped between two hard ends of the metal substrate 502, the FFKM elastomer 504 may be bonded onto an inner diameter of the metal substrate 502, according to one or more embodiments of the disclosure. For example, the metal substrate 502 may be a metal ring. According to one or more embodiments, the metal substrate 502 may be at least one of 13% chromium steel (13Cr), 316 stainless steel, nickel-based steel alloy (e.g., Iconel® 825, Hastelloy alloy, Iconel® 925, etc.), or 9Cr/1 Mo steel, or any other steel substrate. Moreover, the FFKM elastomer 504 may be Kalrez®, Chemraz®, Perlast®, Parofluor®, or any other elastomer or perfluoroelastomer that has a higher amount of fluoride content than FKM and FEPM, as previously described. Further, the FFKM elastomer 504 may be bonded to the metal substrate 502 with a bonding agent, as described in previous embodiments. Moreover, the FFKM elastomer 504 may include a curing agent as described in previous embodiments.

Figure 6:
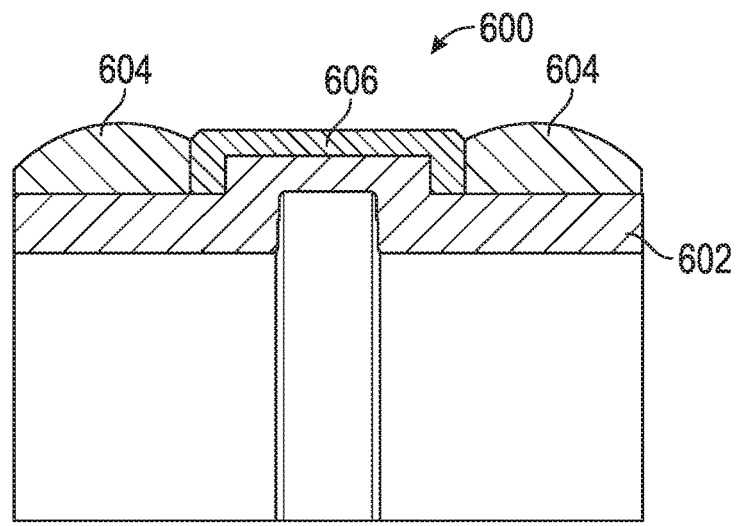
FIG. 6 shows an end of a bonded seal including FFKM according to an embodiment.

FIG. 6 shows an end of a bonded seal including FFKM according to an embodiment. For example, FIG. 6 shows an FFKM bonded seal 600, which includes a metal substrate 602, an FFKM elastomer 604 bonded to each end of the metal substrate 602, and a PEEK ring 606 affixed to the metal substrate 602 for supporting each FFKM elastomer 604. Advantageously the PEEK ring 606 can allow for a smaller extrusion gap. Further, the PEEK ring 606 may exhibit high temperature tolerance, corrosion resistance, thermal degradation resistance, and chemical resistance in downhole applications. In addition to or instead of being bonded to each end of the metal substrate 602, the FFKM elastomer 604 may be bonded onto an inner diameter of the metal substrate 602, according to one or more embodiments of the disclosure.

Still referring to FIG. 6, for example, the metal substrate 602 may be a metal ring. According to one or more embodiments, the metal substrate 602 may be at least one of 13% chromium steel (13Cr), 316 stainless steel, nickel-based steel alloy (e.g., Iconel® 825, Hastelloy alloy, Iconel® 925, etc.), or 9Cr/1 Mo steel, or any other steel substrate.

Still referring to FIG. 6, the FFKM elastomer 604 may be Kalrez®, Chemraz®, Perlast®, Parofluor®, or any other elastomer or perfluoroelastomer that has a higher amount of fluoride content than FKM and FEPM, as previously described. Further, the FFKM elastomer 604 may be bonded to the metal substrate 602 with a bonding agent, as described in previous embodiments. Moreover, the FFKM elastomer 604 may include a curing agent as described in previous embodiments.

Figure 7:
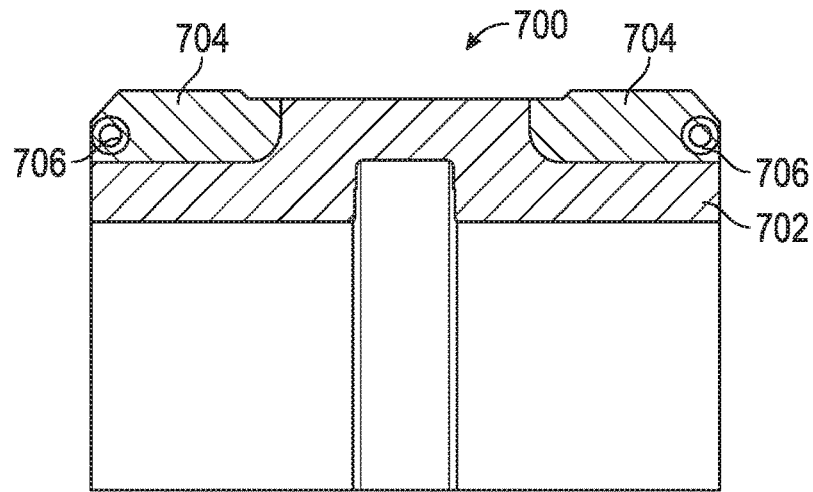
FIG. 7 shows an end of a bonded seal including FFKM according to an embodiment.

FIG. 7 shows an end of a bonded seal including FFKM according to an embodiment. For example, FIG. 7 shows an FFKM bonded seal 700, which includes a metal substrate 702, an FFKM elastomer 704 bonded to each end of the metal substrate 702, and a spring 706 molded into an edge of the FFKM elastomer 704. Advantageously, the spring 706 helps to minimize potential extrusion with respect to the FFKM bonded seal 700. The object molded into the edge of the FFKM elastomer 704 is not limited to a spring. In other embodiments, the object may be a metal ring or other foreign object. In addition to or instead of being bonded to each end of the metal substrate 702, the FFKM elastomer may be bonded onto an inner diameter of the metal substrate 702, according to one or more embodiments of the disclosure.

Advantageously, the bonded seals including an FFKM elastomer according to one or more embodiments of the present disclosure exhibit strong bonding strength after chemical exposure and can survive in static and dynamic seal applications. For example, the FFKM bonded seal according to one or more embodiments may be used for several downhole applications in completions, artificial lift, wireline, testing, perforating tools, or subsea operations.

According to one or more embodiments, the FFKM bonded seal may be selected for application in high sour environments (e.g., high $H_2S$ concentration), especially in environments containing a high concentration of aromatic solvents (e.g., xylene, toluene), and with a high concentration of corrosion inhibitors. Other elastomer types such as NBR/HNBR, FKM, or AFLAS cannot provide the functionality of the FFKM bonded seal according to one or more embodiments of the present disclosure. Indeed, the bonding technology/bonded seal design of the FFKM bonded seal according to one or more embodiments exhibits good mechanical properties with strong anti-extrudability.

Advantageously, the performance of the FFKM elastomer bonded seal may be further enhanced by, for example, increasing the surface area of the seal for bonding, extension of the metal substrate features to prevent tearing/extrusion, bonding a spring or foreign object into the FFKM elastomer for extrusion minimization, or any combination of these features.

CONCLUSION

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A bonded seal comprising:
a metal alloy substrate comprising an outer surface and an inner surface parallel to the outer surface, wherein the outer surface comprises at least two sides;
a bonding agent; and
a perfluoroelastomer bonded to the at least two sides of the outer surface via the bonding agent,
wherein the perfluoroelastomer is ribbed.

2. The bonded seal of claim 1, wherein the metal alloy substrate is at least one selected from the group consisting of: 13% chromium steel, 316 stainless steel, nickel-based steel alloy, 9Cr/1 Mo steel, carbon alloy steel, L-80/N-80, 1 Cr equivalent, 25Cr, and 718.

3. The bonded seal of claim 1, wherein the bonding agent comprises:
an adhesive; and
a primer.

4. The bonded seal of claim 1, wherein the bonding agent is disposed on a surface of the metal alloy substrate.

5. The bonded seal of claim 1, wherein the perfluoroelastomer is impregnated with the bonding agent.

6. The bonded seal of claim 1, wherein the perfluoroelastomer has a higher amount of fluoride content than a fluoroelastomer or a tetrafluoroethylene/propylene rubber.

7. The bonded seal of claim 1, further comprising a curing agent.

8. The bonded seal of claim 7, wherein the curing agent comprises a peroxide.

9. The bonded seal of claim 1, wherein the perfluoroelastomer is supported by a PEEK ring affixed to the metal alloy substrate.

10. The bonded seal of claim 1, wherein the perfluoroelastomer is further bonded to the inner surface of the metal alloy substrate such that the perfluoroelastomer is trapped between two ends of the metal alloy substrate.

11. The bonded seal of claim 1, wherein the perfluoroelastomer comprises a spring molded into an edge of the perfluoroelastomer.

12. The bonded seal of claim 1, wherein the perfluoroelastomer is bonded to at least two sides of the metal alloy substrate.

13. A downhole tool comprising the bonded seal of claim 1.

14. A method of manufacturing a bonded seal comprising:
bonding a perfluoroelastomer to at least two sides of an outer surface of a metal alloy substrate using a bonding agent, and wherein the perfluoroelastomer is ribbed.

15. The method of claim 14, wherein the metal alloy substrate is at least one selected from the group consisting of: 13% chromium steel, 316 stainless steel, nickel-based steel alloy, 9Cr/1 Mo steel, carbon alloy steel, L-80/N-80, 1 Cr equivalent, 25Cr, and 718.

16. The method of claim 14, wherein the bonding agent comprises: an adhesive; and a primer.

17. The method of claim 14, wherein the perfluoroelastomer is impregnated with the bonding agent.

* * * * *